(12) United States Patent
Kishigami et al.

(10) Patent No.: US 7,283,553 B2
(45) Date of Patent: Oct. 16, 2007

(54) DATA RELAY DEVICE AND MULTIPLEX COMMUNICATION SYSTEM

(75) Inventors: Tomohisa Kishigami, Obu (JP); Hajime Kikkawa, Nagoya (JP); Hiroshi Honda, Okazaki (JP)

(73) Assignee: DENSO CORPORATION, Kariya (JP)

( * ) Notice: Subject to any disclaimer, the term of this patent is extended or adjusted under 35 U.S.C. 154(b) by 1037 days.

(21) Appl. No.: 10/292,594

(22) Filed: Nov. 13, 2002

(65) Prior Publication Data
US 2003/0156595 A1   Aug. 21, 2003

(30) Foreign Application Priority Data
Feb. 21, 2002 (JP) ............... 2002-044576

(51) Int. Cl.
*H04L 12/413* (2006.01)
(52) U.S. Cl. .............. 370/445; 370/501; 370/492
(58) Field of Classification Search ............ None
See application file for complete search history.

(56) References Cited

U.S. PATENT DOCUMENTS

| | | | | |
|---|---|---|---|---|
| 5,345,447 A | * | 9/1994 | Noel | 370/362 |
| 5,598,406 A | * | 1/1997 | Albrecht et al. | 370/296 |
| 5,657,327 A | * | 8/1997 | Hamada et al. | 370/389 |
| 5,734,675 A | * | 3/1998 | Leonowich | 375/211 |
| 5,774,658 A | * | 6/1998 | Kalkunte et al. | 709/230 |
| 5,919,250 A | * | 7/1999 | Shimokawa | 709/252 |
| 5,936,962 A | * | 8/1999 | Haddock et al. | 370/446 |
| 5,978,383 A | * | 11/1999 | Molle | 370/445 |
| 6,434,112 B1 | * | 8/2002 | Kwon | 370/216 |

FOREIGN PATENT DOCUMENTS

| | | |
|---|---|---|
| EP | 1030482 | 8/2000 |
| JP | A-H2-47943 | 2/1990 |
| JP | A-H07-307759 | 11/1995 |
| JP | A-2000-269993 | 9/2000 |

* cited by examiner

*Primary Examiner*—Bob A. Phunkulh
(74) *Attorney, Agent, or Firm*—Posz Law Group, PLC (57) ABSTRACT

A data relay device connected with a plurality of networks is provided with a transmission timing adjusting device for adjusting the timing of transmission of data frames. The relay device provides a time zone, in which transmission of new data frame to the network is inhibited immediately after transmission of data frame to the network of the relaying destination. Accordingly, even when the data frame to be relayed to the network is concentrated in the data relay device, the data frame from nodes of the network can be transmitted using the time zone.

2 Claims, 8 Drawing Sheets

DATA RELAY DEVICE AND MULTIPLEX COMMUNICATION SYSTEM

CROSS REFERENCE TO RELATED APPLICATION

This application is based on and incorporates herein by reference Japanese Patent Application No. 2002-44576 filed on Feb. 21, 2002.

FIELD OF THE INVENTION

The present invention relates to a data relay device (repeater) and a multiplex communication system.

BACKGROUND OF THE INVENTION

In recent years, sophisticated information communication is advanced particularly with progress of the computer technology. For example, in the field of automobile, quantity of information to be exchanged among electronic controllers for controlling loaded electronic instruments is increasing rapidly. Consequently, a multiplex communication system is employed in order to reduce the number of wire harnesses used for transfer of information.

In this multiplex communication system, nodes such as a control ECU or the like are connected to the common communication line for exchanging data frames among the nodes. Since the communication line is used in common, various access systems are proposed for mediation of collision between data frames on the communication line.

As the access system, those like a CSMA/CD in which each node detects signals on the communication line to mediate collision between data frames depending on the priority information included in the header of data frame are known. In these access systems, the node to transmit the data frame stops transmission of data frame upon detection of the priority which is higher than that of data frame and thereby the data frame having the highest priority acquires the right of transmission.

In the case of automobiles which require a variety of controls, many nodes are sorted to the groups of different attributes such as communication rate or the like to form a plurality of networks in order to assure efficient data communication, a data relay device is provided as a common node for a plurality of networks and communication between the nodes in different networks is conducted through the data relay devices.

A node generally executes the management of transmission timing to assure smooth transmission of data frames. For example, in the node from which the data from a sensor to detect conditions of the control objects is transmitted periodically, when many sensors are used, the data can be transmitted by dispersing the data frames within such period.

However, since the transmission timing is not adjusted between the nodes in the access system such as CSMA/CD, if the transmission timing is controlled within each node, the data frames may be transitionally centralized to the particular node and are then transmitted depending on the scale of network.

This event is easily generated in the data relay device. Therefore, it is also proposed that the priority is set for the data to a higher level so that the data frame to be relayed or relayed does not remain for a longer period in the relay device or the priority is set again in the data relay device. Under this situation, a load of communication rises at a time in the network of the data relaying (repeating) destination. Particularly, this condition may be often observed in the relaying process to the network of lower communication rate from the network of higher communication rate and capacity.

As a result, the transmission timing of data frames is excessively delayed in the node of the network in the relaying destination.

Moreover, a situation will arise, in which not only the transmission timing is delayed but also the preceding data still remains in the transmission queue when the data to be transmitted is generated, depending on the capacity of a buffer to temporarily store the data to be transmitted. In this case, the data in the transmission queue is lost when the newly generated data is over-written. For example, when the data of the same kind to be obtained in the same time series are lost in a part of the period or when the data such as a switching operation information generated abruptly is generated, an apparatus does not follow the switching operation and a switch operator understands such operation as a fault of apparatus.

SUMMARY OF THE INVENTION

The present invention therefore has an object to provide a data relay device and a multiplex communication system, which can transmit data, when the relaying of data is transitionally concentrated, without causing excessive delay in the nodes of a network of a relaying destination and moreover can reduce loss of data.

According to the present invention, a data relay device of a multiplex communication system relays data frames between networks. Nodes for exchange of data frames on a communication line are provided as common nodes of a plurality of networks for adjusting collision of data frames by detecting a signal on the communication line upon a transmission of own data frames. The data relay device includes a transmission timing adjusting device for adjusting the transmission timing of data frames to provide a time zone where a new data frame is not transmitted to a predetermined network immediately after an end of transmission of data frames to the present network.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENTS

First Embodiment

Figure 1:
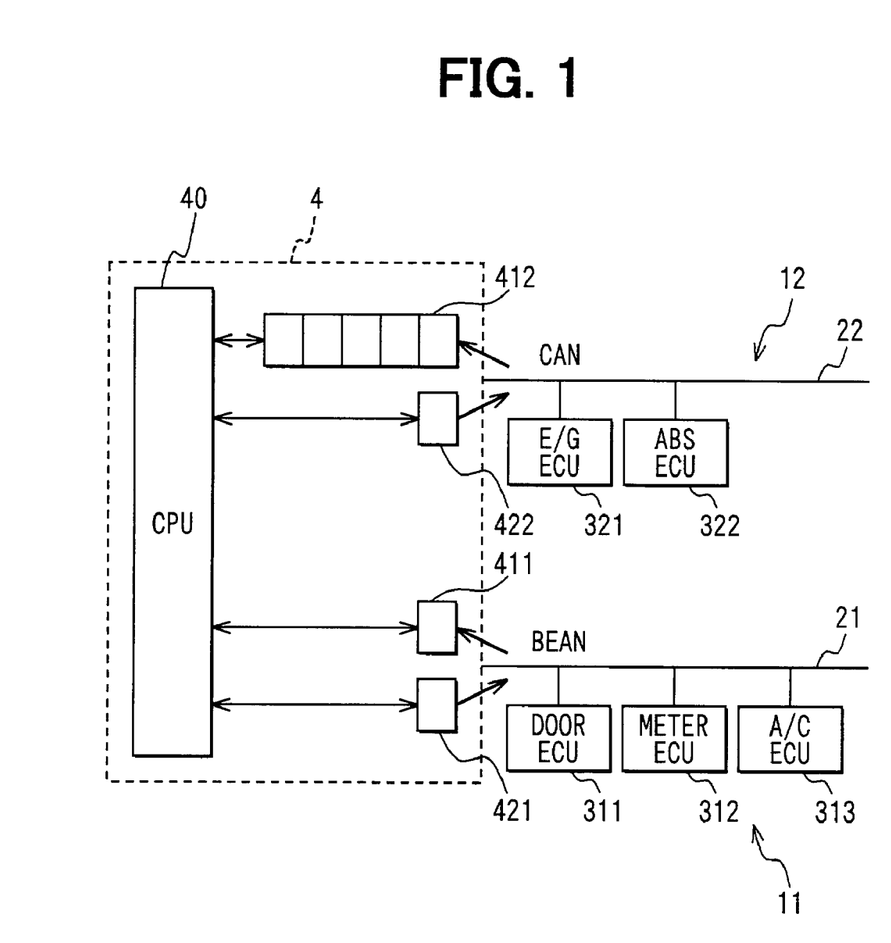
FIG. 1 is a block diagram of a multiplex communication system according to a first embodiment of the present invention.

Referring to FIG. 1, a multiplex communication system is provided for internal controls within a vehicle, in which a plurality of networks 11, 12 (two networks in the figure) are provided. The networks 11, 12 include nodes 311 to 322 connected to communication lines 21, 22 so that data may be exchanged among the nodes 311 to 322 with the predetermined communication protocol on the communication lines 21, 22.

The first network 11 connects, as the nodes, a door control ECU 311 for controls such as opening and closing of doors or the like, a meter ECU 312 for controls such as meter display or the like and an air-conditioner ECU 313 for controls such as air-conditioning within the vehicle. The communication protocol of the first network 11 is the BEAN in the communication rate of b 10 kbps. The second network 12 connects, as the nodes, an engine control ECU321 for controlling the engine and ABSECU322 for ABS control.

The communication protocol of the second network 12 is the CAN in the communication rate of 500 kbps. The first network 11 is defined as the low speed network, and the second network 12 the high speed network. Moreover, the communication line 21 is defined as low speed communication line, while the communication line 22 the high speed communication line.

The communication lines 21, 22 of the networks 11, 12 are respectively connected to a common data relay device (repeater) 4. The data relay device 4 operates as one node of each network 11, 12. The data relay device 4 relays (repeats) the data transmitted from the nodes 311 to 322 to the nodes 311 to 322 belonging to the other networks 11, 12.

The data relay device 4 has an ordinary hardware structure including a microcomputer and a communication IC. As illustrated in FIG. 1, receiving buffers 411, 412 for temporarily storing the received data frames and transmitting buffers 421, 422 for temporarily storing the transmitting data frames are provided for each network 11, 12. A CPU 40 conducts the transfer process among these buffers 411, 412, 421, 422. The transferred data is then transmitted to the communication lines 21, 22 from the communication IC. The receiving buffer 411 for low speed network 11 is defined as the low speed receiving buffer, while the receiving buffer 412 for high speed network 12 is defined as the high speed receiving buffer, the transmitting buffer 421 for low speed network 11 is defined as the low speed transmitting buffer, and the transmitting buffer 422 for high speed network 12 is defined as the high speed transmitting buffer. The high speed receiving buffer 412 is capable of storing a plurality of data frame at a time.

Moreover, in the transfer process, a header or the like of the data frame is changed to that matching with the communication protocol of the networks 11, 12 of the relaying destination. In this case, however, data relaying can be realized smoothly by giving the highest priority.

Figure 2:
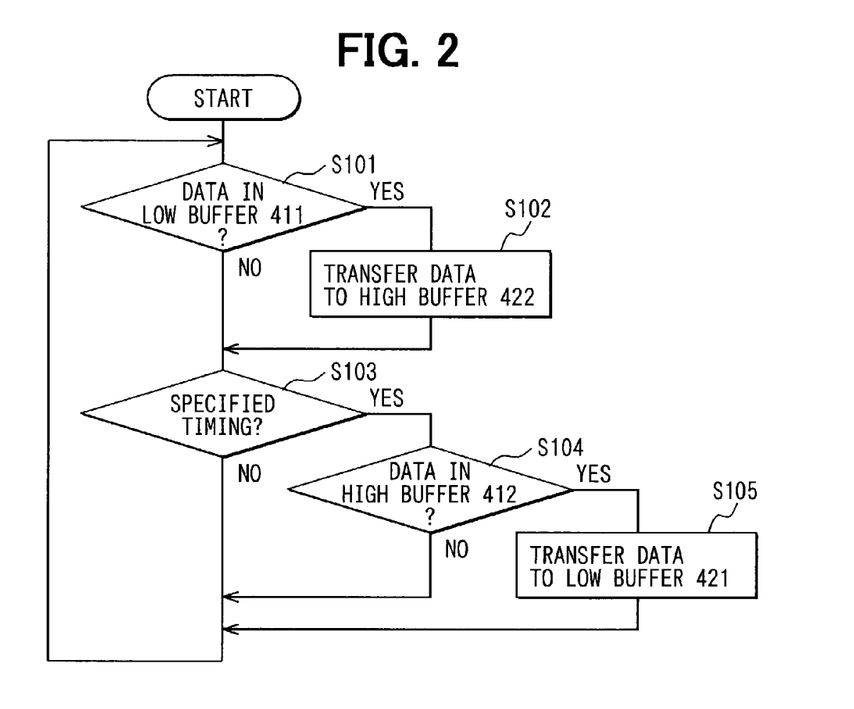
FIG. 2 is a flowchart illustrating a data transfer process of a data relay device forming the multiplex communication system of FIG. 1.

The CPU 40 is programmed to execute a control program for the transfer process to the transmitting buffers 421, 422 from the receiving buffers 411, 412. Steps S101, S102 indicate the transfer process to the high speed receiving buffer 412 from the low speed receiving buffer 411. At step S101, it is determined whether a data exists in the low speed receiving buffer 411. When the determination result is YES, the data in the low speed receiving buffer 411 is transferred to the high speed transmitting buffer 422 (step S102) and the process proceeds to step SlO3. The data transferred to the high speed transmitting buffer 422 is transmitted to the high speed communication line 22. When the determination result is NO at step S101, the process proceeds to step S103 by skipping step S102.

At step S103, whether the transmission timing is the specified timing or not is determined as the transmission timing adjusting unit of the CPU 40. When the determination result is YES, the process proceeds to step 104. When the determination result is NO, the process returns to step S101. The specified timing is given once in every preset specified time T0. Thereby, the sequence after step S104 is executed in the interval of the specified time T0.

The specified time T0 is set a little longer than the transmission time (maximum frame length) when the largest data frame of the data itself is transmitted in the BEAN protocol which is the communication protocol of the low speed network 11.

The processes at steps S104 and S105 are transfer processes to the low speed receiving buffer 421 from the high speed receiving buffer 412. At step S1O4, whether the data exists in the high speed receiving buffer 412 or not is determined. When the determination result is YES, the data in the high speed receiving buffer 412 is transferred to the low speed transmitting buffer 421 (step S105) and the process returns to step S101. The data transferred to the low speed transmitting buffer 421 is transmitted to the low speed communication line 21. When the result at step S104 is NO, the process returns to step S101 by skipping step S105.

Since the specified time T0 is set a little longer than the maximum frame length TF, even when the data frames are sequentially fetched by the high speed receiving buffer 412, that is, when the data to be relayed to the low speed network 11 from the high speed network 12 is concentrated, the data relay device 4 does not transfer the data to the low speed transmitting buffer 421 from the high speed receiving buffer 412. It therefore does not transmit the data to the low speed network 11 until the specified timing comes after the end of transmission to the low speed network 11.

Figure 3:
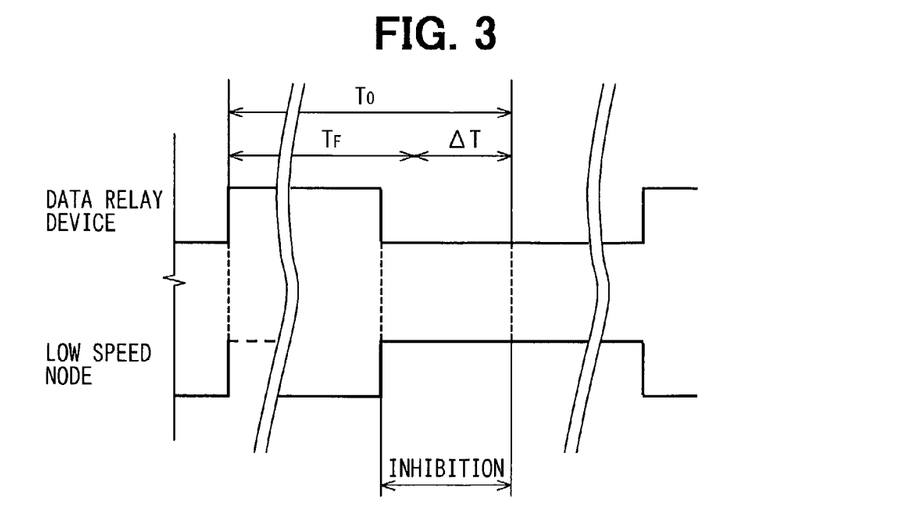
FIG. 3 is a timing chart illustrating operation of the multiplex communication system of FIG. 1.

FIG. 3 illustrates the transmitting condition on the low speed communication line 21 when the data frame from the data relay device 4 collides with the data frame from the nodes 311, 312 of the low speed network 11 under the condition that the data relayed to the low speed network 11 from the high speed network 12 is concentrated. In this figure, transmission of data frames is started on the low speed communication line 21 from the data relay device 4 and the node 311 or node 312 and the data relay device 4 and the node 311 or node 312 respectively detect the signals on the low speed communication line 21. When the priority is transmitted following the leading bit (SOF) of the data frame, the node 311 or node 312 stops transmission by detecting priority higher than that of the data frame transmitted therefrom and the data relay device 4 obtains first the right of transmission. The data relay device 4 completes the transmission of data frame.

The nodes 311, 312 trying to transmit the data frame transmits, upon detection of the predetermined bit train (EOF) indicating the end bit of the data frame from the data relay device 4, the data frame. In the prior art, the subsequent data frame from the data relay device 4 given the higher priority obtains here the right of transmission, but in this invention, the data relay device 4 is inhibited to execute the next transmission to the low speed network 11 until the next specified timing comes. A time-zone where in the transmission is inhibited is different depending on the size of data frame which has been just transmitted to the low speed network 11. At least the period ($\Delta T$)=specified time T0—maximum frame length TF can be assured. The timing when the transmission of data frame is started is not strictly matched with the specified timing, but the time required for the transfer process is sufficiently shorter than the specified time T0 and therefore it may be indicated as illustrated in the figure.

Accordingly, in this time zone, the data frames from the nodes 311, 312 are adjusted only between the nodes 311, 312 without any collision with the data frames from the data relay device 4 and then transmitted. The data frame whose transmission is inhibited is transferred to the low speed transmitting buffer 421 when the next specified timing appears, and is then transmitted to the low speed communication line 21.

Thus, while the data is relayed to the low speed network 11 from the high speed network 12, the nodes 311, 312 of the low speed network 11 can transmit, even in this time zone, the data frame having the priority which is lower than that of the data to be relayed.

Thereby, the data frame in the low speed network 11 can be transmitted sequentially even when the priority thereof is relatively lower than that of the data frame from the data relay device 4, while transmission from the data relay device 4 is executed. Accordingly, loss of data in the nodes 311, 312 can be reduced.

Second Embodiment

Figure 4:
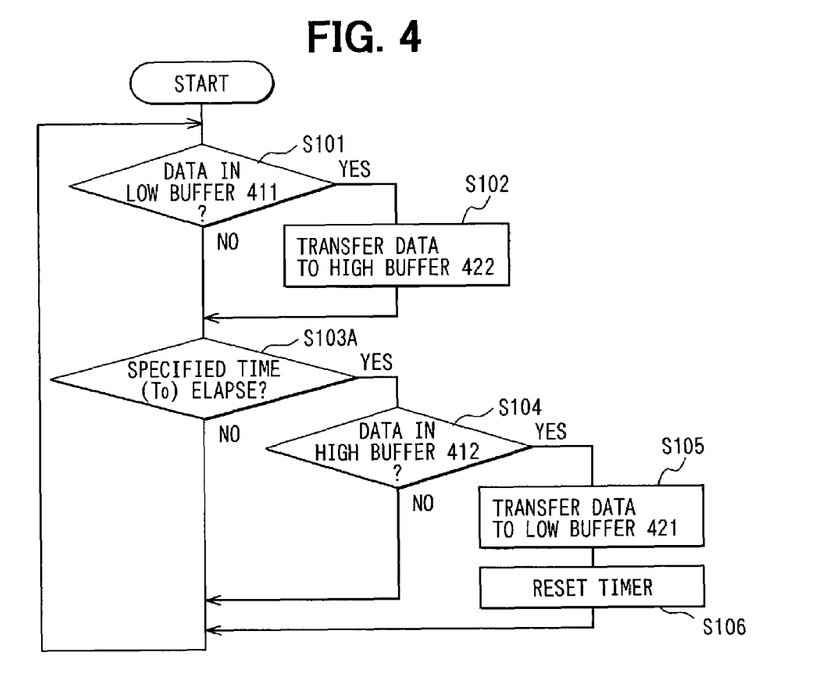
FIG. 4 is a flowchart illustrating a data transfer process of a data relay device forming a multiplex communication system according to a second embodiment of the present invention.

In a second embodiment, the control program executed by the CPU 40 is modified as shown FIG. 4. Step S103A following step S102 is the transmission timing adjusting unit of the CPU 40 in combination with the subsequent step S106. In this step, whether the elapse of time measured with a timer has exceeded the specified time T0 or not is determined. When the determination result is YES and the data is fetched to the high speed receiving buffer 412 (step S104), this data is transferred to the low speed transmitting buffer 421 (step S105). The timer is set (step S106) following step S105 and the process returns to step S101. While the timer for counting up the elapse of time is reset in every specified time T0 in the first embodiment, the timer is not reset in the second embodiment when the data is not transferred to the low speed transmitting buffer 421.

Figure 5:
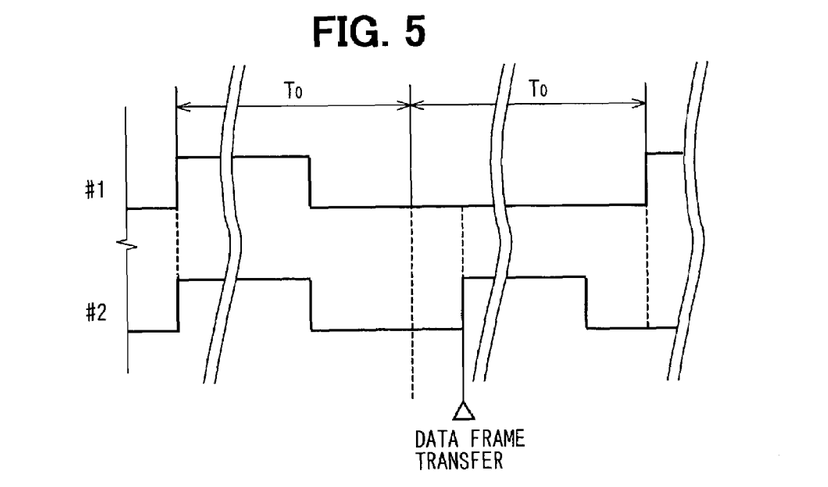
FIG. 5 is a timing chart illustrating operation of the multiplex communication system of FIG. 4.

FIG. 5 illustrates conditions of data frame transmission of data relay device, in comparison between the first embodiment (#1) and second embodiment (#2), in the condition where the data frame is not transmitted from the nodes 311 to 313 of the low speed network 11 and data frame is dispersively transmitted from the high speed network 12 and therefore data relaying is not concentrated.

When it is assumed that the data frame is received from the high speed network 12 after the specified time T0 has passed from the transfer of data frame, the data of high speed receiving buffer 412 is not transferred to the low speed transmitting buffer 421 until the next specified time T0 passes in the first embodiment, and therefore the transmission process to the low speed communication line 11 is not executed. However, in the second embodiment, when the data frame is received from the high speed network 12 after the first specified time T0 has passed, transfer to the low speed transmitting buffer 421 is immediately executed. Accordingly, under the condition that the data frames are dispersively transmitted from the high speed network 12, the data relaying is conducted immediately to the low speed network 11 from the high speed network 12.

Third Embodiment

Figure 6:
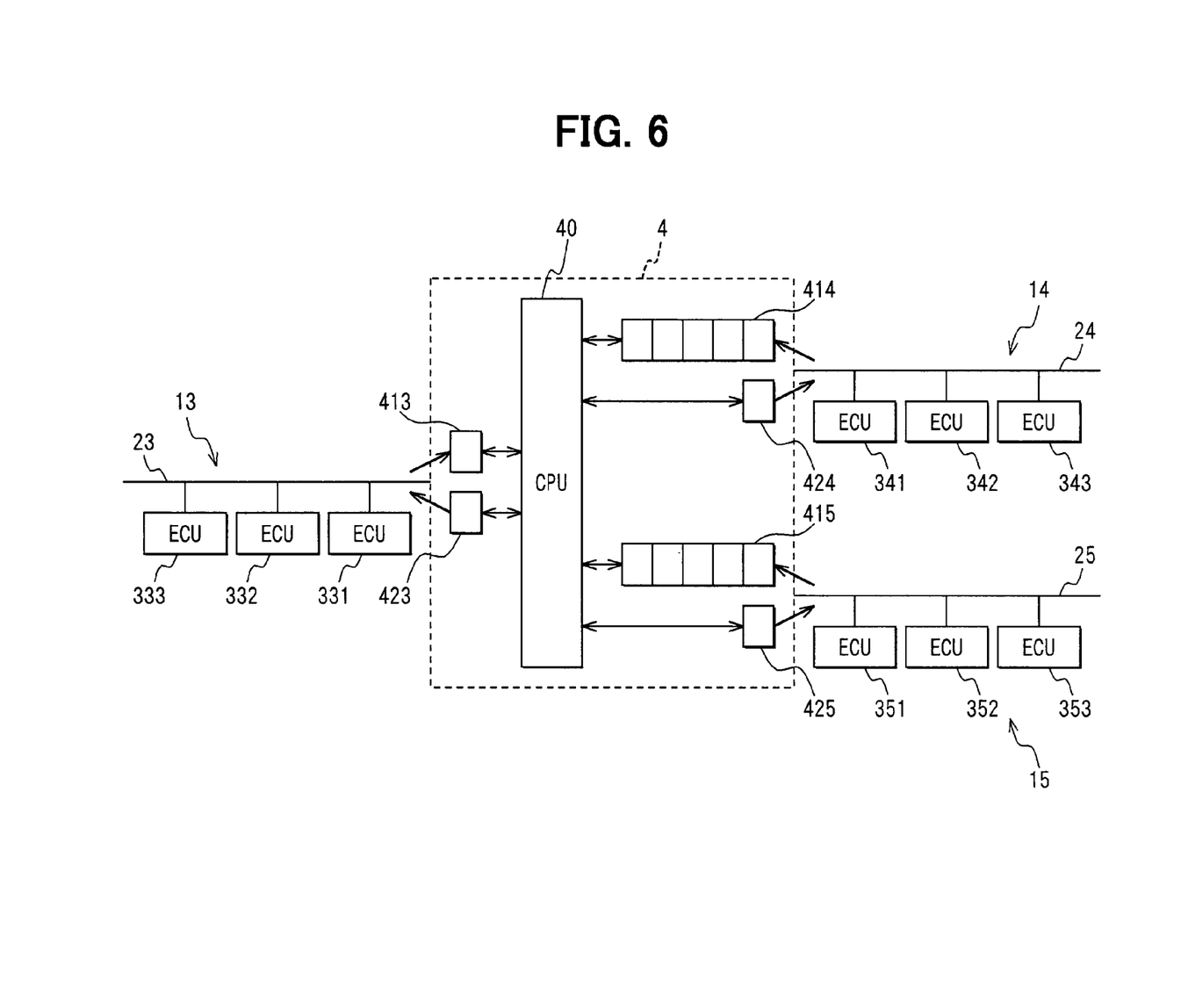
FIG. 6 is a block diagram of a multiplex communication system according to a third embodiment of the present invention.

In a third embodiment shown in FIG. 7, a multiplex communication system has three networks 13, 14, 15 with nodes 331, 332, 341, 342, 343, 351, 352, 353. The network 13 is used for the communication protocol such as BEAN for low communication rate, while the networks 14, 15 are used for the communication protocol such as CAN for high communication rate. The network 13 is defined as the low speed network, while the networks 14 and 15 the first and the second high speed networks, respectively. In this embodiment, the ECU group of the high speed network is divided into two ECU groups and the network is formed of an ECU group having the closer relationship.

The data relay device 4 is provided, corresponding to networks 13 to 15 on the one-to-one basis, with the receiving buffers 413, 414, 415 for temporarily storing the data frames received from communication lines 23, 24, 25 of the networks 13 to 15 and transmitting buffers 423, 424, 425 for temporarily storing the data frames transmitted to the communication lines 23 to 25. The receiving buffer 413 for low speed network 13 is defined as the low speed receiving buffer, the transmitting buffer 423 is defined as the low speed transmitting buffer. The receiving buffer 414 for the first high speed network 14 is defined as the first high speed receiving buffer, and the transmitting buffer 424 the first high speed transmitting buffer. The receiving buffer 415 for the second high speed network 15 is defined as the second high speed receiving buffer, and the transmitting buffer 425 the second high speed transmitting buffer.

The high speed receiving buffers 414, 415 is capable of storing a plurality of data frames at a time. Moreover, the communication line 23 of the low high speed network 13 is defined as the low speed communication line, the communication line 24 of the first high speed network 14 is defined as the first high speed communication line and the communication line 25 of the second high speed network 15 is defined as the second high speed communication line.

Figure 7:
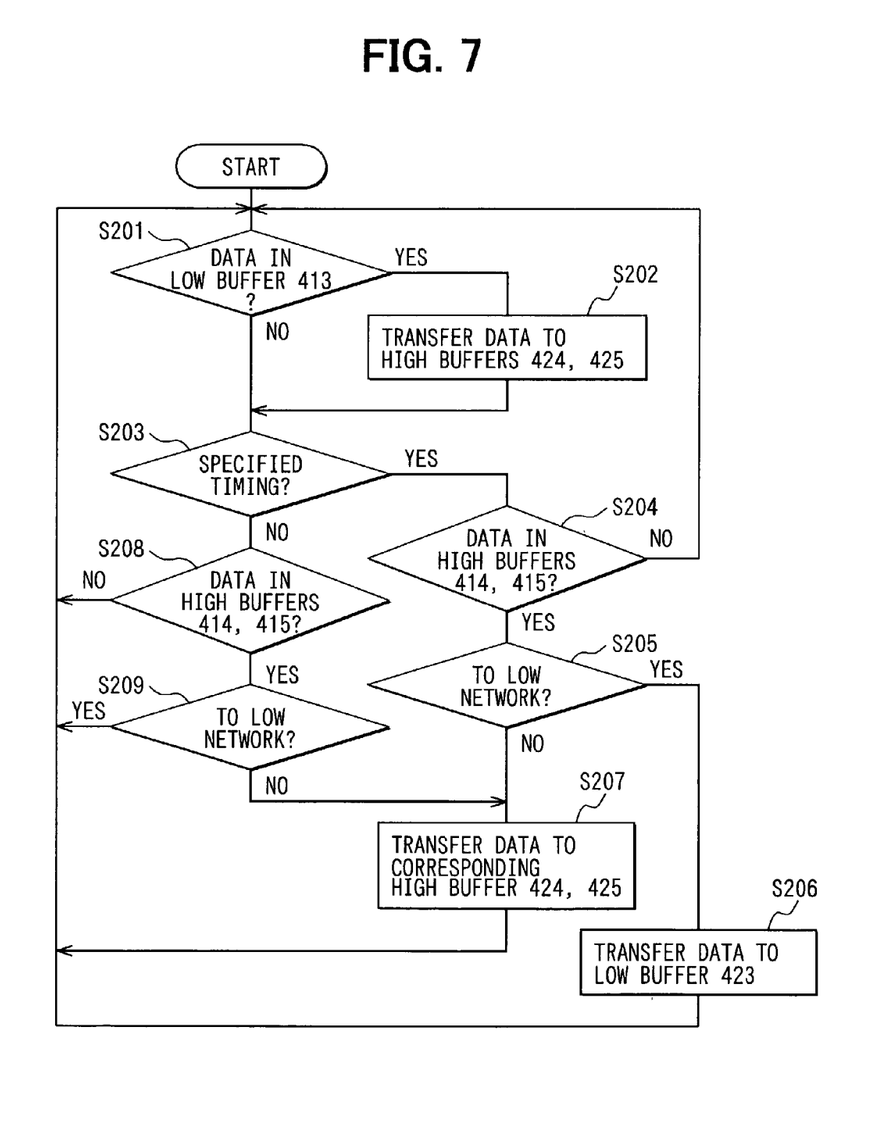
FIG. 7 is a flowchart illustrating a data transfer process of a data relay device forming the multiplex communication system of FIG. 6.

The CPU 40 is programmed to execute the control program shown in FIG. 7. This is a transfer process to the transmitting buffers 423 to 425 from the receiving buffers 413 to 415. Steps S201, S202 execute the transfer processes to the high speed transmitting buffers 424, 425 from the low speed receiving buffer 413, while whether the data exists in the low speed receiving buffer 413 or not is determined at step S201. When the determination result is YES, the data in the low speed receiving buffer 413 is transferred (step S202) to the high speed transmitting buffers 424, 425 corresponding to the relaying destination and the process proceeds to step S203. The data transferred to the high speed transmitting buffers 424, 425 is then transmitted to the high speed communication lines 24, 25. When the determination result is NO at step S201, the process proceeds to step S203 by skipping step S202.

Step S203 indicates the transmission timing adjusting unit of the CPU 40. That is, whether the specified timing has come or not is determined. When the determination result is YES, the process proceeds to step S204. When the determination result is NO, the process proceeds to steps S208. Here, whether the specified timing has come or not is determined as in the case of the first embodiment (step S103) and step S204 is executed in the interval of the specified time. The specified time is set a little longer than the maximum frame length in the communication protocol of the low speed network 13.

Steps S204 to S209 indicate the transfer processes between the high speed receiving buffers 414, 415 and the transfer process to the low speed transmitting buffer 423 from the high speed receiving buffers 414, 415. At step S204, whether the data exists or not in the high speed receiving buffer 414 or in the high speed receiving buffer 415. When the determination result is YES, the process proceeds to step S205. When the determination result is NO, the process returns to step S201. At step S205, whether the relaying destination is the low speed network 13 or not is determined. When the determination result is YES, That is, in the case of the relaying to the low speed network 13 from the high speed networks 14, 15, the data in the high speed receiving buffer 414, 415 is transferred to the low speed transmitting buffer 423 and the process returns to step S201. The data transferred to the low speed transmitting buffer 423 is transmitted to the low speed communication line 23.

The result of step S205 to determine whether the relaying destination is the low speed network 13 or not becomes NO in the case of the data relaying between the high speed networks 14 and 15, and the transfer of data is conducted between the high speed receiving buffers 414, 415 and the high speed transmitting buffers 424, 425. That is, when the data exists in the first high speed receiving buffer 414, this data is transferred to the second high speed transmitting buffer 425, and when the data exists in the second high speed receiving buffer 415, this data is transferred to the first high speed transmitting buffer 414 at step S207. The data transferred to the high speed transmitting buffers 424, 425 is then transmitted to the high speed communication lines 24, 25. Then, the process returns to step S201.

At step S208 to be executed when the result of step S203 to determine whether the specified timing has come or not is NO, like step S204, whether the data exists or not in the high speed receiving buffer 414 or high speed receiving buffer 415 is determined. When the determination result is YES, the process proceeds to step S209 and when the determination result is NO, the process returns to step S201. At step S209, like step S205, whether the relaying destination is the low speed network 13 or not is determined. When the determination result is YES, that is, when the data is relayed to the low speed network 13 from the high speed networks 14, 15, the process returns to step S201. The data in the high speed receiving buffers 414, 415 is not transferred to the low speed transmitting buffer 423. When the result of step S209 is NO, that is, when the data is relayed between the high speed networks 14, 15, the process of step S207 is executed and the process returns to step S201.

In this third embodiment, relaying of data to the low speed network 13 from the high speed networks 14, 15 is conducted with an interval of the specified time or an integer times thereof and the relaying of data to the high speed networks 14, 15 from the low speed network 13 and the relaying of data between the high speed networks 14, 15 are executed when the data is fetched to the high speed receiving buffers 414, 415.

When a plurality of high speed networks are used like this embodiment, the timer may be reset, like the second embodiment, when the data in the high speed receiving buffer is transferred to the low speed transmitting buffer and thereby the data can be relayed quickly under the condition that the data is fetched dispersively to the high speed receiving buffer.

Fourth Embodiment

Figure 8:
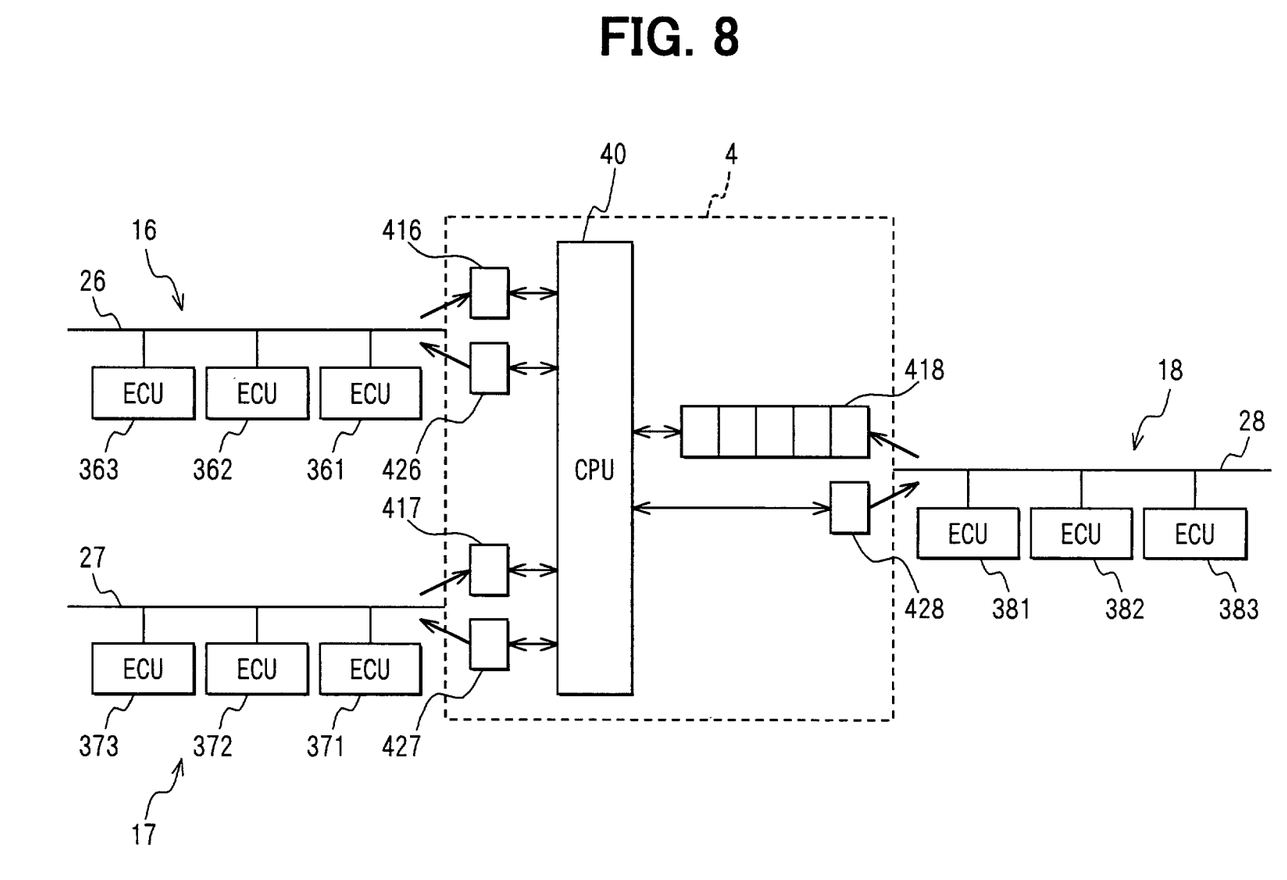
FIG. 8 is a block diagram of a multiplex communication system according to a fourth embodiment of the present invention.

In a fourth embodiment shown in FIG. 8, nodes 361, 362, 363, 371, 372, 373, 381, 382, 383 form three networks 16, 17, 18, and data relaying is conducted via the data relay device 4 among the networks 16 to 18. For the networks 16, 17, the communication protocol BEAN is used for low communication rate, while for the network 18, the communication protocol CAN is used for high communication rate. The network 16 is defined as the first low speed network, while the network 17 the second low speed network 17. The network 18 is defined as the high speed network. In this embodiment, for example, the ECU group of the low speed network is divided into two ECU groups, and the network is formed of the ECU group of the closer relationship.

The data relay device 4 is provided, corresponding to the respective networks 16 to 18 on the one-to-one basis, with receiving buffers 416, 417, 418 for temporarily storing the data frames received from communication lines 26, 27 of the networks 16 to 18 and transmitting buffers 426, 427, 428 for temporarily storing the data frames to be transmitted to communication lines 26 to 28. Here in after, the receiving buffer 416 for the first low speed network 16 is defined as the first low speed receiving buffer and the transmitting buffer 426 is defined as the first low speed transmitting buffer, the receiving buffer 417 for the second low speed network 17 is defined as the second low speed receiving buffer and the transmitting buffer 427 is defined as the second speed transmitting buffer. The receiving buffer 418 for the high speed network 18 is defined as the high speed receiving buffer, and the transmitting buffer 428 is defined as the high speed transmitting buffer 428. The high speed receiving buffer 418 is capable of storing a plurality of data frames at a time. Moreover, the communication line 26 of the first low speed network 16 is defined as the first low speed communication line, the communication line of the second low speed network 17 is defined as the second low speed communication line and the communication line 28 of the high speed network 18 is defined as the high speed communication line.

Figure 9:
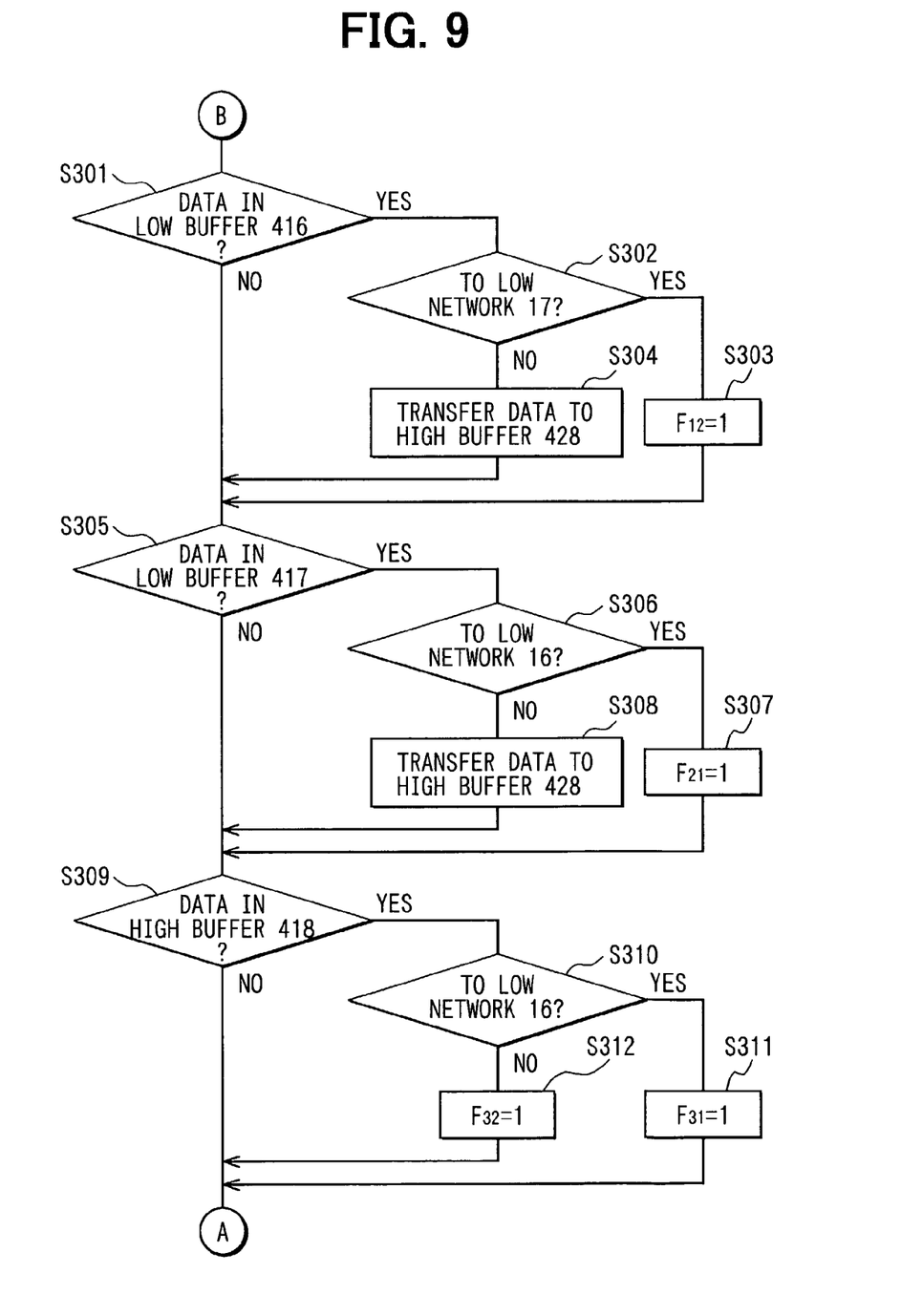
FIG. 9 is a flowchart illustrating a data transfer process of a data relay device forming the multiplex communication system of FIG. 8.
Figure 10:
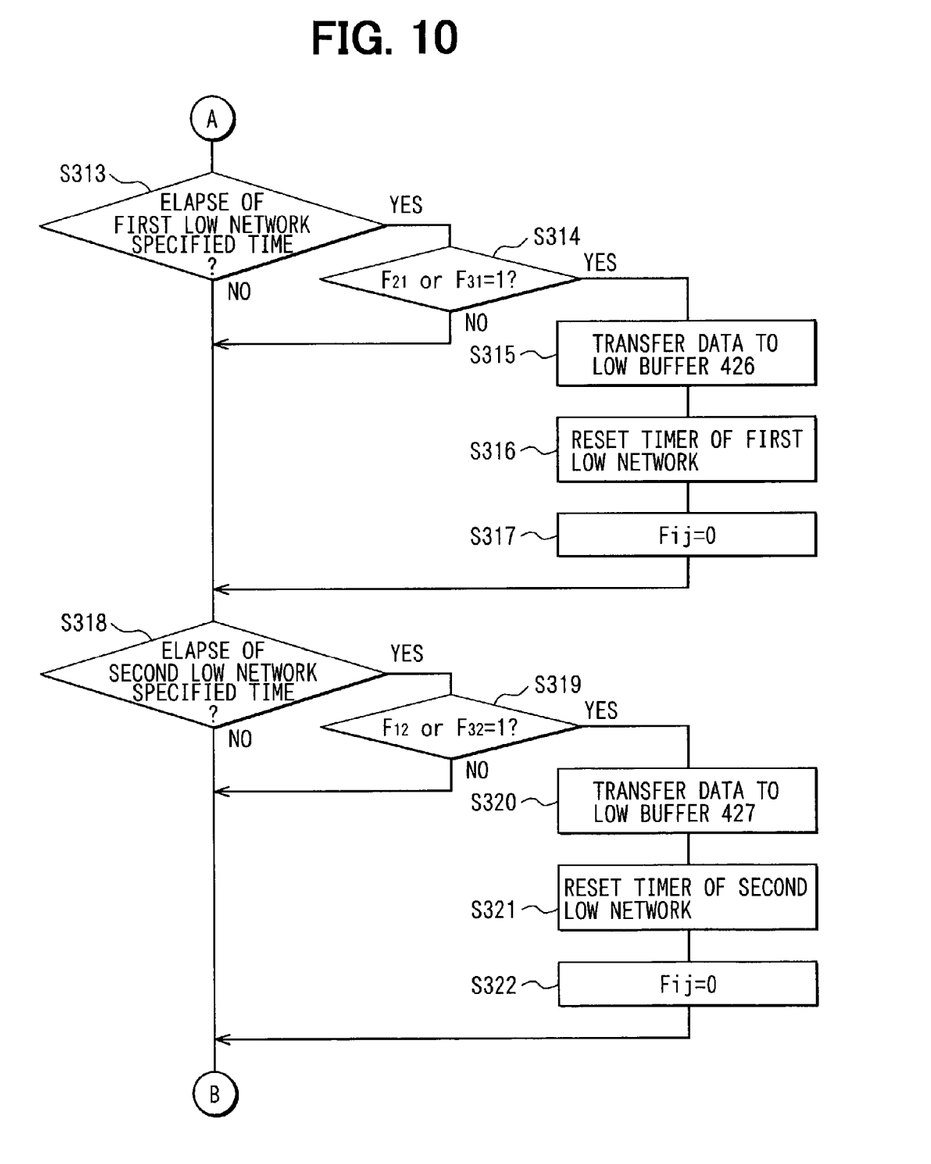
FIG. 10 is a flowchart illustrating a data transfer process of the multiplex communication system of FIG. 8.

The CPU 40 is programmed to execute the control program shown in FIG. 9 and FIG. 10, which illustrate the transfer processes to the transmitting buffers 426 to 428 from the receiving buffers 416 to 418. It is first determined whether the data exists in the first low speed receiving buffer 416 or not at step S301. When the determination result is YES, it is determined whether the relaying destination is the second low speed network 17 or not (step S302). When the determination result is YES, a flag F12 is set to 1 (step S303) and the process proceeds to step S305. The result at step S302 is NO when the data is relayed to the high speed network 18 from the first low speed network 16. In this case, the data is transferred to the high speed transmitting buffer 428 from the first low speed receiving buffer 416 (step S304) and the process proceeds to step S305. The data transferred to the high speed transmitting buffer 428 is transmitted to the high speed communication line 28. When the result at step S301 is NO, the process proceeds to step S305.

At step S306, it is determined whether the data exists in the second low speed receiving buffer 417 or not. When the determination result is YES, whether the relaying destination is the first low speed network 16 or not is determined (step S306). When the determination result is YES, the flag F21 is set to 1 (step S307) and the process proceeds to step S309. The result of step S307 is NO for the relaying of data to the high speed network 18 from the second low speed network 17. In this case, the data is transferred to the high speed transmitting buffer 428 from the second low speed receiving buffer 417 (step S308) and the process proceeds to step S309. The data transferred to the high speed transmitting buffer 428 is then transmitted to the high speed communication line 28. Moreover, when the result at step S305 is NO, the process proceeds to step S309.

At step S309, whether the data exists in the high speed receiving buffer 418 or not is determined. When the determination result is YES, whether the relaying destination is the first low speed network 16 or not is determined (step S310). When the determination result is YES, the flat F31 is set to 1 (step S311) and the process proceeds to step S312. When the determination result is NO, the flag F32 is set to 1 (step S312), the process proceeds to step S313. Then when the result at step S309 is NO, the process also proceeds to step S313.

At step S313, whether the specified time T01 for the first low speed network 16 has passed or not is determined. The specified time T01 is counted with a timer for the first low speed network 16. The specified time T01 is set a little longer then the maximum frame length of the first low speed network 16.

When the determination result is YES, whether the flag F21 or the flag F31 is set to "1" or not is determined (step S314). Since the flag F21 and flag F31 become "1" when the data to be relayed to the first low speed network 16 is fetched by the second low speed receiving buffer 417 and high speed receiving buffer 418, this data is transferred to the first low speed transmitting buffer 426 (step S315). Here, the timer is reset (step S316) and the flag F21 or flag F32 corresponding to the data transferred is set to "0" (step S317) and the process proceeds to step S318.

The result of step S314 is NO when there is no data to be transferred to the first speed transmitting buffer 426 from the second low speed receiving buffer 417 and high speed receiving buffer 418. In this case, the process proceeds to step S318 by skipping steps S315 to S317. Moreover, when the result of step S313 is NO, the process also proceeds to step S318.

At step S318, whether the specified time T02 for the second low speed network 17 has passed or not is determined. The specified time is counted with the timer for the second low speed network 17. The specified time T02 is set a little longer than the maximum frame length of the second low speed network 17.

When the determination result is YES, it is determined whether the flag F12 or the flag F32 is set to "1" or not (step S319). Both flags F12, F32 become "1" when the data to be relayed to the second low speed network 17 is fetched by the first low speed receiving buffer 416 and high speed receiving buffer 418, this data is transferred to the second low speed transmitting buffer 427 (step S320). The data transferred to the second low speed transmitting buffer 427 is then transmitted to the second low speed communication line 27. Here, the time is reset (step S321) and the flag F12 or the flag F32 corresponding to the data transferred is set to "0" (step S322) and the process returns to step S301.

The result of step S319 is NO when the data to be transferred to the second low speed transmitting buffer 427 from the high speed receiving buffer 418 does not exist and the process returns to step S301 by skipping steps S320 to S322. Moreover, when the result of step S318 is NO, the process also returns to step S301.

In this embodiment, steps S313, S316, S318, S321 are provided as the transmission timing adjusting unit of the CPU 40. Therefore, relaying of data to the first low speed network 16 is not executed until the specified time T01 comes immediately after the relaying of data to the first low speed network 16 and the relaying of data to the second low speed network 17 is not conducted until the specified time T02 has come immediately after the relaying of data to the second low speed network 17. Therefore, the nodes 361 to 373 of the low speed networks 16, 17 are capable of holding the transmission period. Relaying of data to the high speed network 18 from the low speed networks 16, 17 is conducted when the data is fetched by the low speed receiving buffers 416, 417 under the condition that the high speed transmitting buffer 428 is idle.

Moreover, like the second embodiment, when the specified time has passed without relation to the timing for receiving the data to be relayed, the data can be transferred in this embodiment upon reception of data to be relayed.

As explained above, the present invention can also be applied when a plurality of low speed networks are used. In this case, the number of low speed networks is not limited two.

When a plurality of low speed networks is used like this embodiment, it is also possible that the transfer to the low speed transmitting buffer is allowed in the interval of the specified time like the first embodiment. In this case, whether the specified timing has come or not is determined for each network.

When the relaying destination of data is concentrated to the particular network in above embodiments, a well known means may be introduced. For example, data is transferred in the sequence of reception as a means for management of the transfer sequence of data to the transmitting buffer.

Moreover, in the data relay device, the transmission timing of the data frame is adjusted in the manner to provide a time zone in which new transmission of data frame is not conducted to the low speed network immediately after the transmission of the data frame to the low speed network by executing the transmission process of data frame to the low speed network in the period of specified time T0 (first and third embodiments), or by inhibiting the transmission process of the data frame to the low speed network until the specified time T0 has passed from the just preceding transmission of the data frame to the low speed network (second and fourth embodiments).

However, the present invention is not limited there to. For example, the next transmission of data frame to the low speed network may be inhibited for the preset period from the end of transmission of data frame to the low speed network. In this case, the time zone becomes constant without relation to the size of data frame when the data frames are sequentially transmitted to the low speed network from the data relay device and there by the time required for the data relaying can be controlled as much as possible.

Moreover, the present invention can also be applied to the multiplex communication system in which a plurality of low speed networks and high speed networks are provided.

Moreover, the present invention is applied to the multiplex communication system for relaying of data between the networks in different communication rates, but the present invention can also be applied, for example, to the systems using the common communication protocol. That is, the present invention can also be effectively applied to the data relay device where many data may be concentrated at a time depending on the number of nodes belonging to the network and excessive delay of transmission may be generated in the node of the network of the relaying destination.

What is claimed is:

1. A data relay device for relaying data frames between networks in which nodes for exchange of data frames on a communication line are provided as common nodes of a plurality of networks for adjusting collision of data frames by detecting a signal on the communication line upon a transmission of own data frame, comprising:

a transmission timing adjusting unit for adjusting the transmission timing of a data frame to provide a time zone where a new data frame is not transmitted to a predetermined network immediately after an end of transmission of the data frame to the present network, wherein:

the transmission timing adjusting unit is configured to periodically execute a relaying process of the data frame to the predetermined network in a period of a preset specified time; and the specified time is set longer than a maximum transmission time of the data frame in the predetermined network.

2. A multiplex communication system comprising:

a plurality of networks for exchange of data frames on a communication line provided as common nodes; and a transmission timing adjusting unit connected to the networks for adjusting the transmission timing of a data frame to provide a time zone where a new data frame is not transmitted to a predetermined network immediately after an end of transmission of the data frame to the present network, wherein:

the transmission timing adjusting unit is configured to periodically execute a relaying process of the data frame to the predetermined network in a period of a preset specified time; and the specified time is set longer than a maximum transmission time of the data frame in the predetermined network.

* * * * *